US008600829B2

(12) United States Patent
Carpenter

(10) Patent No.: US 8,600,829 B2
(45) Date of Patent: *Dec. 3, 2013

(54) PROVIDING NOTICE AND PURCHASING A GIFT IN AN ONLINE OR ELECTRONIC ENVIRONMENT

(71) Applicant: Friendgiftr, Inc., Los Angeles, CA (US)

(72) Inventor: Robert Carpenter, Los Angeles, CA (US)

(73) Assignee: Friendgiftr, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,027

(22) Filed: Mar. 1, 2013

(65) Prior Publication Data

US 2013/0179300 A1 Jul. 11, 2013

Related U.S. Application Data

(63) Continuation of application No. 13/541,546, filed on Jul. 3, 2012, now Pat. No. 8,412,585, which is a continuation of application No. 12/861,215, filed on Aug. 23, 2010, now abandoned.

(51) Int. Cl.
*G06Q 30/00* (2012.01)
(52) U.S. Cl.
USPC ........................................................ 705/26.1
(58) Field of Classification Search
USPC ............................................... 705/26.1–27.2
See application file for complete search history.

(56) References Cited

U.S. PATENT DOCUMENTS

| 6,609,106 | B1 | 8/2003 | Robertson |
| 7,013,292 | B1 | 3/2006 | Hsu et al. |
| 2003/0074265 | A1 | 4/2003 | Oshima |
| 2005/0033650 | A1 | 2/2005 | Robertson |
| 2005/0197919 | A1 | 9/2005 | Robertson |
| 2007/0208627 | A1 | 9/2007 | Abadi |
| 2008/0301005 | A1 | 12/2008 | Nieda et al. |
| 2010/0036746 | A1 | 2/2010 | Hashop et al. |
| 2010/0161449 | A1 | 6/2010 | Hsu et al. |
| 2010/0161450 | A1 | 6/2010 | Hsu et al. |
| 2010/0274680 | A1 | 10/2010 | Carlson et al. |

OTHER PUBLICATIONS

Couples Plan Weddings, Want Guests to Foot Bill, Oliviero, H., Atlanta Journal—Constitution, Sep. 6, 2009, p. A1.
Best Free Online Wishlist, Wedding Registry, Baby Registry / Wishpot. Web. Jan. 10, 2011. <http://www.wishpot.com/>.
PriceGrabber.com—Comparison Shopping Beyond Compare. Web. Jan. 10, 2011. <http://www.wishpot.com/>.

*Primary Examiner* — Jeffrey A Smith
*Assistant Examiner* — Ethan D Civan
(74) *Attorney, Agent, or Firm* — Steptoe & Johnson LLP

(57) ABSTRACT

Various embodiments are directed to systems and methods for funding the purchase of one or more gifts. In one embodiment, a method for purchasing gifts may include providing a computing device configured to access one or more retailer websites. Each retailer website may list one or more gifts available for purchase. The method may include selecting a plurality of gifts available for purchase. The method may include ranking the selected plurality of gifts to indicate a funding order. The method may include receiving one or more monetary contributions to fund the purchase of one or more of the selected plurality of gifts. The method may include allocating the one or more monetary contributions according to the rank of the selected plurality of gifts prior to purchase of one or more of the gifts. The method may include deselecting at least one of the selected gifts.

24 Claims, 1 Drawing Sheet

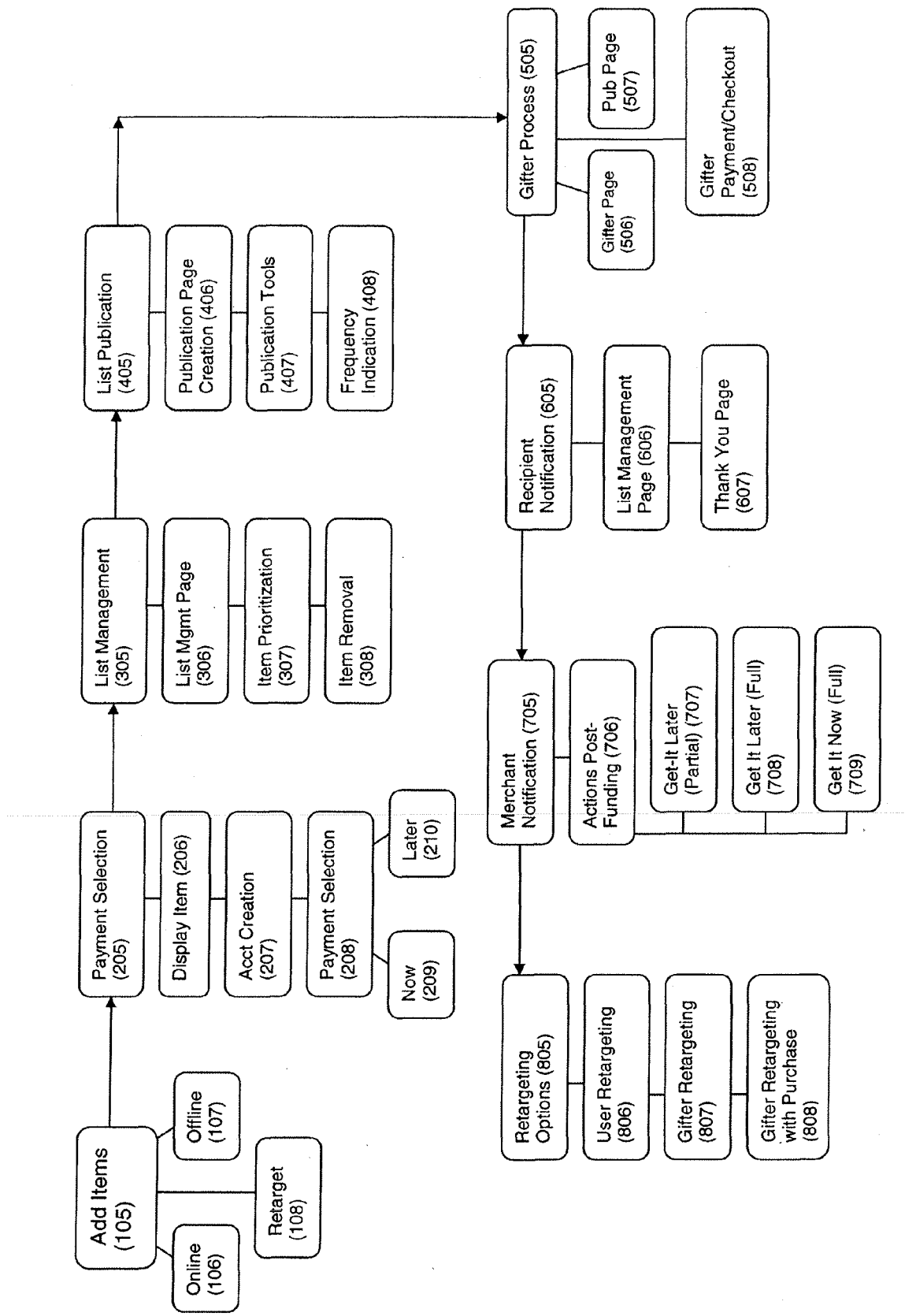

PROVIDING NOTICE AND PURCHASING A GIFT IN AN ONLINE OR ELECTRONIC ENVIRONMENT

CROSS-REFERENCE TO RELATED APPLICATIONS

This application is a continuation of U.S. patent application Ser. No. 13/541,546, filed Jul. 3, 2012, which is a continuation of U.S. patent application Ser. No. 12/861,215, filed Aug. 23, 2010, both of which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The field of the subject matter is directed to methods and systems for identifying, providing notice of and purchasing a gift in an online or electronic environment.

BACKGROUND

Generally, there are several ways to purchase and send gifts to friends and family, including purchasing the item directly in a store, purchasing the item online, reviewing a gift registry, identifying a gift and buying it, or sending cash to the family member or friend so that he/she can purchase his/her own gift. All of these methods involve the same process: a) identifying an occasion or reason to buy a gift, b) identifying what gift the person would like or is appropriate for the person, c) buying the gift, and in some cases, d) shipping the gift.

There are several established methods whereby someone with a birthday, wedding or another occasion in the future can let their friends and family know of his/her gift wishes, including a gift registry at a particular store, a note or a "wish list". Each of these methods has limitations. For example, a gift registry is usually set up at one store, such as Macy's or Crate & Barrel. The registrant is limited to gifts at that store and also to prices at the store or online. Then, there is the issue of providing notice. Usually, the registrant sends out a card or E-mail to a list of family and friends notifying them of the gift registry. In many instances, these notices are sent out days or weeks in advance of the occasion and can get lost in a pile of paperwork or Outlook inbox. Notes and wish lists are even more prone to being lost or forgotten, not to mention that some friends and family may be inadvertently missed or not included on the mailing list.

A relatively new online service, www.wishpot.com, allows users to post desirable gifts across social media networks and allows users to "price shop" or compare prices for specific gifts online, similar to a service such as www.pricegrabber.com. While this service is advancing the gift-giving process online, it still does not address several key ideal embodiments, such as the ability to pay for part or all of a single gift or multiple gifts based on the priority of the giftee or user, the ability to process payments off of the retailer's website in order to simplify ordering and payment, and the ability to follow up with the users and gifters if either of them leave or terminate the service without purchasing at least part of an item.

To this end, it would be desirable to produce and utilize reliable methods and systems of identifying, providing notice of and purchasing at least one tangible gift in an online or virtual environment. Such ideal methods would include at least one of the following goals and/or ideals: a) the ability to post desirable gifts across social media networks, b) the ability to generate electronic mail to family and friends, c) the ability to "price shop" or compare prices online, d) the ability to pay for part or all of a single gift or multiple gifts, e) the ability for the recipient to get immediate delivery, allowing for gift givers to "pay the balance", f) the ability to process payments off of the retailer's website in order to simplify ordering and payment, and g) the ability to follow up with both users and gifters if either leave or terminate the service without purchasing at least part of an item.

SUMMARY

Briefly, and in general terms, various embodiments are directed to systems and methods for funding the purchase of one or more gifts.

In some embodiments, methods of purchasing a gift include: providing a retailer website, providing a FriendGiftr website, selecting at least one gift on the retailer website, retailer catalog, retail store or combination thereof, selecting a FriendGiftr payment option on the retailer website, connecting with the FriendGiftr website and accessing options to display the at least one gift. Contemplated methods also include paying for part or all of a single gift or multiple gifts, setting up "immediate gratification" delivery or a combination thereof.

In some embodiments, software systems are also provided for purchasing at least one gift, comprising: providing an Internet connection or two way communication connection, providing a retailer website on the internet or two way communication portal, providing an executable FriendGiftr software program, selecting at least one gift on the retailer website, retailer catalog, retail store or combination thereof, selecting a FriendGiftr payment option on the retailer website, executing the FriendGiftr software program; and accessing options to display the at least one gift.

In some embodiments, methods of purchasing at least one gift, comprise: providing a retailer website, retail catalog, retail store or a combination thereof, providing a FriendGiftr website, providing at least one notice of at least one gift that has been selected, reviewing the at least one notice, accessing the FriendGiftr website; and paying for at least part of the at least one gift.

In some embodiments, a method for purchasing gifts may include providing a computing device configured to access one or more retailer websites. Each retailer website may list one or more gifts available for purchase. The method may include selecting a plurality of gifts available for purchase. The method may include ranking the selected plurality of gifts to indicate a payment reimbursement order. The method may include purchasing the ranked, selected plurality of gifts. The method may include receiving one or more monetary contributions. The method may include allocating the one or more monetary contributions according to the rank of the purchased gifts. The method may include deselecting at least one of the purchased gifts.

In some embodiments, a system for purchasing gifts may include a computing device configured to connect to one or more retailer websites over a communication portal. Each retailer website may list one or more gifts available for purchase. The system may include an application executable by the computing device or a website server to enable a user to select a plurality of gifts available for purchase, to rank the selected plurality of gifts to indicate a payment reimbursement order, to purchase the ranked gifts, to receive one or more monetary contributions after the purchase of the ranked gifts, and to deselect at least one of the purchased gifts. The application may be configured to allocate one or more monetary contributions according to the rank of the purchased gifts.

In some embodiments, a method for purchasing gifts may include providing a computing device configured to access one or more retailer websites. Each retailer website may list one or more gifts available for purchase. The method may include selecting a plurality of gifts available for purchase. The method may include ranking the selected plurality of gifts to indicate a funding order. The method may include receiving one or more monetary contributions to fund the purchase of one or more of the selected plurality of gifts. The method may include allocating the one or more monetary contributions according to the rank of the selected plurality of gifts prior to purchase of one or more of the gifts. The method may include deselecting at least one of the selected gifts.

In some embodiments, a system for purchasing gifts may include a computing device configured to connect to one or more retailer websites over a communication portal. Each retailer website may list one or more gifts available for purchase. The system may include an application executable by the computing device or a website server to enable a user to select a plurality of gifts available for purchase, to rank the selected plurality of gifts to indicate a funding order, to receive one or more monetary contributions to fund the purchase of one or more of the selected plurality of gifts, and to deselect at least one of the selected gifts. The application may be configured to allocate each monetary contribution according to the rank of the selected plurality of gifts before purchase of one or more of the gifts.

BRIEF DESCRIPTION OF THE DRAWING

FIG. 1 shows a flow chart of a contemplated process or method.

DETAILED DESCRIPTION

Reliable methods and systems of identifying, providing notice of and purchasing at least one tangible gift in an online or virtual environment have been developed and are described herein that include at least one of the following goals and/or ideals: a) the ability to post desirable gifts across social media networks, b) the ability to generate electronic mail to family and friends, c) the ability to "price shop" or compare prices online, d) the ability to pay for part or all of a single gift or multiple gifts, e) the ability for the recipient to get immediate delivery, allowing for gift givers to "pay the balance", f) the ability to process payments off of the retailer's website in order to simplify ordering and payment, and g) the ability to follow up with both users and gifters if either leave or terminate the service without purchasing at least part of an item.

Specifically, a method of purchasing a gift includes: a) providing a retailer website, b) providing a FriendGiftr website, c) selecting at least one gift on the retailer website, retailer catalog, retail store or combination thereof, d) selecting a FriendGiftr payment option on the retailer website, retail catalog, retail store or a combination thereof, e) connecting with the FriendGiftr website; and f) accessing options to display the at least one gift. Contemplated methods also include paying for part or all of a single gift or multiple gifts, in some embodiments based on the priority list or order of the gifter, user or giftee recipient, setting up "immediate gratification" delivery, following up with users and/or gifters who navigate off of or out of the service without completing a purchase or gift or a combination thereof.

In contemplated embodiments, inventory located at a retailer warehouse or distributor location or a gift card/gift certificate is transformed into a tangible gift for an individual after payment is completed. This contemplated process allows for individuals to complete this process in a new and different way from conventional methods. As used herein, the phrase "FriendGiftr website", "FriendGiftr platform" or "FriendGiftr" are used interchangeable and means and/or refers to any website, application, online or electronic service that at least allows for users to set up accounts, interfaces and/or communications with retailer websites and tracks and processes payments or partial payments for at least one gift.

An individual begins by going to a contemplated FriendGiftr website and setting up an account. The account can include links to the individual's contact databases, including social media accounts, or the individual's Microsoft Outlook™.

E-mail contact list, the individual's Linked-In™ account or a combination thereof. It is contemplated that an individual can use a local computer, network computer, handheld device or phone to access the FriendGiftr website, the retailer website or a combination thereof, including using these devices or machines to set up the necessary accounts. Corresponding local or network software, including iPhone™, iPad™, Cloud™ or Android™/Droid™ Apps, may be utilized in part or all of the process and methods outlined herein.

In contemplated methods, a retailer website is then provided and accessed by the individual where the website includes gift items that someone wants to receive. Contemplated retailer websites include any suitable website that sells goods and/or services, such as conventional merchant websites, auction websites or websites that collect goods and services from a number of other sources and compile them as a third-party vendor or reseller. The retailer website may be accessible either through the FriendGiftr website (such as a click-through link or banner ad) or may be accessed outside of the FriendGiftr website by opening a new browser or by navigating off of the FriendGiftr website. As mentioned, gifts can also be selected through retail catalogs and/or retail stores. In these instances, the item's bar code or catalog code can be entered at the FriendGiftr website.

The individual user (also referred to as "giftee" or "recipient") then reviews at least one retailer website and selects at least one gift that he/she would like to receive. At this point, the gift or gifts are put into a queue or cart at the retailer website. Once the individual has selected all of the desirable gifts, the individual then navigates through to the payment page of the retailer website. Under Payment Method, a FriendGiftr logo or icon will be located next to other more traditional methods of payment, including credit card, PayPal or gift certificate. The individual clicks on the FriendGiftr icon and is immediately transferred to a FriendGiftr website, either by navigating off of the retailer website or by opening up a FriendGiftr website in a new browser.

Once the individual navigates over to the FriendGiftr website and confirms that he/she is logged in, the individual is provided with a menu of options available as to how to notify friends and family members (herein referred to as "gifters") that a gift is ready to be purchased. The individual can select Facebook.com only, or Facebook, Evite and E-mail, or LinkedIn and Facebook or a combination thereof, along with other available social or networking sites. It is instructive to note that the giftee may store a list of desirable gifts from a number of websites or offline sources in one place and on one list on the FriendGiftr website.

At this point, the FriendGiftr platform accesses the selected notification sites to provide a public notice to the individual's friends, family and contacts that the individual has selected a gift or gifts for his/her birthday, wedding or another occasion. Friends, family and other contacts may then log onto the FriendGiftr website and provide part or the entire purchase price for the at least one gift. A contemplated gifter may pay as little or as much as he/she wants to apply to the purchase price of one or more items. For example, the individual giftee may select three gifts and then rank them on the FriendGiftr site in a "priority list" as to how they want them paid for and/or received. When the gifter goes in and pays $100, that $100 is distributed in priority order to the individual's gift choices. So, if the first priority gift is $75 and the second priority gift is $50, then the gifter pays the entire $75 on the first gift and $25 dollars toward the purchase of the second gift. If the balance of the second gift remains after a predetermined period of time, the individual giftee can either pay the remaining balance on that gift or "e-return" the gift for a gift certificate or gift card from the retailer website.

In contemplated embodiments, FriendGiftr notifies the retailer when the items can be shipped. In particular, a system has been created that will use the retailer's existing payment options (namely if they have the ability to pay by gift card), and FriendGiftr will—in the background—process the delayed order through their existing other payment methods, thereby not needing to bank transfer the payment to them directly. However, in some embodiments, the gifter may want to utilize a bank transfer or PayPal transfer (which includes a bank transfer feature) and both of these are available as embodiments.

In some embodiments, once the purchase price for a gift is paid, FriendGiftr notifies the retailer website that the gift can be sent to the individual giftee. In other embodiments, the individual giftee purchases the gift when it is selected, and the FriendGiftr option is used to pay the individual giftee back directly—also known as the "immediate gratification" delivery option. For this option, the individual giftee and/or recipient pays for the entire amount up front with credit card or some other suitable payment. The recipient receives the item right away, but the gift list is still published. Now, when gifters contribute to the list, on a date certain, FriendGiftr would refund the recipient the total gifted amount as a refund on their credit card, a check, or a gift card.

As mentioned, in some embodiments, FriendGiftr utilizes a price searcher database or spider/crawler to locate the best price for the at least one gift, if the individual/recipient wants to use that option. This option is one piece of the FriendGiftr method, service or process.

EXAMPLES

The following examples outline several steps, including optional steps, in a contemplated process according to the disclosure herein. It should be understood that these examples are meant to be illustrative of a contemplated process and not necessarily the only contemplated process. The Examples are divided into different steps of the process in order describe each in detail and are shown in FIG. 1.

Definition of Terminology Used in Following Examples

Merchant: Merchant includes traditional retail merchants, auction merchants (E-Bay), third-party vendors (Amazon) and nonprofits/charities, as well as other individuals or organizations that a user may either purchase goods or services from (i.e. travel agents) or have a financial obligation to (i.e. utility companies, credit card companies, banks, etc.). A contemplated merchant may also be a site where individuals list and sell their own goods/services, such as Craigslist. As defined in specification above, merchants are included in the set of retailer websites.

User: Person or entity who/that is going to receive the eventual item/gift, and make the selection as to what he/she/it wants. The user may also be referred to as the giftee, individual giftee and/or recipient.

Gifter: Person or entity who/that user knows who is contributing funds to the User for a particular gift/item.

Example 1

Selecting and Adding Gifts and Items (105)

Add Item Online (106):

User is presented with several possible ways to add the item to their gift wish list, which is referred to in this example as a FriendGiftIT list (or "FG list") but it could be referred to as any terminology depending on the needs of the FriendGiftr website.

In one embodiment, they can be presented with the button to add next to an item before the shopping cart (i.e. on the item description page, besides the "add to shopping cart" button or link, there is also a "FriendgiftIT!" ("FG button" or "FG link") as well).

In another embodiment, they can be presented with the button during the payment phase during checkout (i.e. FG button or link is listed with "pay by credit card", pay by "gift card" or promotional code, and "pay by PayPal" options).

In yet another embodiment, they can be presented with the button or link if they abandon the site (i.e. when the user closes the window or tab to leave the merchant, the merchant can serve up another window that says something like, "wait, don't leave yet. Why don't you FriendGiftIT with your friends' money?" or "wait, don't leave yet. Why don't you ask your friends to FriendGiftIT to you?") This option may be presented in the form of a separate pop-up window, an E-mail, a text message or another suitable notification source.

Merchant then transmits the information about the item to the FriendGiftr website electronically, with a minimum of information, including merchant name and item price with shipping, handling and tax information. They can also send the FriendGiftr service and/or website additional information optionally to improve the user experience including the item name, description, and photo. The merchant may also update the FriendGiftr website with new information on the product/gift—such that it is out of stock or on sale.

Another contemplated method of adding a gift online is through an online auction. The FriendBidIT function, or similar function, allows the giftee to list an auction for a potential gift at the FriendGiftr website and notify potential gifters that the giftee would like an item that is currently under auction. Gifters may go in and bid on the item for the giftee. In some embodiments, if the gifter can access the auction website through the FriendGiftr website and bid directly at the auction website or the gifter can select "anonymous" on the FriendGiftr website and bid on the item anonymously, so that the gifters name isn't shown on the auction website.

Add Item Offline (107):

In another contemplated embodiment, user can add items they find offline to their FG list. In one related embodiment, they can enter the item name, UPC or similar code, or other means of identifying the item via their mobile device to their FG list while they are shopping at a store (or alternatively, remember the item description, and go online to the FriendGiftr website later and add it that way).

In another related embodiment, using their own credit/debit card or a Friendgiftr-branded credit/debit card, they can pay for the item at the point-of-sale (POS), and afterwards select which purchase of their credit/debit card they wish to add to their FG list.

The FriendGiftr service and/or website populates the list with this information either via a pre-populated catalog previously given to the FriendGiftr service and/or website by merchant or real-time electronically, with merchant name and item price including tax. Alternatively, the FriendGiftr service and/or website can also get this information as well via the user's credit card transaction report.

User/Gifter Retargeting (108):

If the user or gifter instead does not choose to check out, but abandons the shopping cart, the FriendGiftr service and/or website will retarget that user or gifter as illustrated in Example 8.

Example 2

FRIENDGIFTIT User Payment Selection and Payment (205)

Display item (206): Once the user has FriendgiftITed the item, the user is then presented with a page that displays the merchant name/logo, item (if the FriendGiftr service and/or website have the information) and price of the item.

User account creation (207): User is presented with the option to login if he's already created a FG account, or to create a new one. This step does not necessarily have to be at this step and can alternatively happen at different points (i.e. after choosing a payment selection, for example).

Payment Selection (208): The user is then presented with two different options to pay for gift.

Option 1: Get It Now ("GIN"—209), which allows the user to get the item right away, and as people "fund" the gift, the money collected will be refunded back to the user on their credit card or whatever method they used to initially fund the gift ("i.e. "your friends pay off your credit card"). It could also be stored in a FriendGiftr account for later use.

Option 2: Get it Later (210), which means the user gets the item only once the gift is fully funded (i.e. "Layaway paid off by others"). Note that if the user has already purchased the item (i.e. offline using a credit card), the only option will be "Get it now".

Get it now (209): if the user chooses to Get it now, he will then be presented with different options to pay for the gift, including (but not exclusively limited to) credit card, PayPal, Bill me later, etc.

Example 3

List Management (305)

List Management page (306): The FriendGiftr service and/or website now creates a custom page with all items that the user has now FriendGiftITed, much like a wish list or registry. On this page, the FriendGiftr service and/or website tells the user what items he has; what the cost of each is, which is "Get it Now" and "Get it Later", and how much funding left is required for each item.

Item Prioritization (307): On the list management page, the user can then prioritize the FG list items in the order of funding (i.e. top item gets funded first, second item is next, etc).

Item removal (308): The user can remove items from the list if he likes; however, if the item is already partially or fully funded, the FriendGiftr service and/or website will either immediately apply the balance of that item to the first item on the list, or alternatively, issue a gift card/merchant credit to him for that particular merchant tied to that item.

Example 4

Item/List Publication (405)

Publication Page creation (406): the FriendGiftr service and/or website creates a custom web page for the user to publicize to his friends/family with a custom URL, or similar. On this page, it shows the items he wants, in the order he's set, as well as optionally an indication as to what event he wants this item for (i.e. birthday, engagement, housewarming, graduation, etc.) and when that event occurs.

This page will also list the amount still needed to fund each item, the names of each gifter associated with each item as well as how much they've paid (optional, and can be controlled by the user, gifter, or both).

Publication tools (407): User is then presented with different ways to publicize the list, including social networks (i.e. Facebook, Twitter), E-mail, widget and/or API (that they can embed in websites) and card by conventional postal mail. This notification tool list is not comprehensive, but just for purposes of illustration, since it is clear the intention of the publication step.

Frequency Indication (408): On this page, the user can also indicate frequency of publication (i.e. tweet about this every xx days), message to be attached ("hey, if you're wondering what you want to get for me"), and whether to immediately publicize when someone has funded/partially funded a gift. In addition, each page has a custom URL or similar identifiable information, so that the user can give or publicize that URL in any way he wants.

Example 5

Gifter Process (505)

Gifter page (506): Once the gifter clicks on the link to see what's on the list, he will be sent back to the Publication Page (507) as outlined in Example 4. From there, he can see what items the recipient wants, how much funding left is necessary to buy the item, and who has already funded which item. The gifter can either click on a "Fund this" button next to a particular item which funds that particular item, or just "Fund the stuff Bob wants the most" ("Fund list") which means the gifter's money will fund starting from the top of the list downwards.

If the gifter chooses the "Fund list" option, the FriendGiftr service and/or website system will automatically apply the funds in the order of each item until the total gifter fund is used up. For example, let's say user has a $25 clock, a $30 toy, and a $500 computer on his list in that order. Gifter throws in $100 to the list. The gifter will then automatically be credited with buying the entire clock, the entire toy, and $45 towards the purchase of the computer.

Gifter payment/checkout (508): Gifter is presented with ways to pay for his fund, including CC, PayPal, etc. In addition, the gifter has the option to publicize the purchase, only publicize to the recipient, or anonymous, with options to show either how much he spent or not.

Example 6

Recipient Notification and Thank You Portal

Recipient notification (605): Once gifter funds the purchase, the user is notified of the gift. The user goes back to the FG list management page (606) created in Example 3, and see's exactly what's been funded, by who, and how much (if the gifter chooses to publicize to the user). Next to each gifter's name, amount, and item that was funded, is a button that the user can click to thank the gifter. Alternatively, if the user has already thanked the gifter, the button is shaded out or replaced with text that indicates that the user has already thanked them.

Thank you page (607): When the user clicks on the "Thanks" button, he will be brought to a page where he can then write a thank you note back for that particular gift(s) that the money funded, and can send the thank you card via email, social platforms, card via post, etc. This list is for illustrative purposes only, and not comprehensive.

Example 7

Merchant Notification (705) and Recipient Payoff Options

Actions post-funding (706): As funding comes in, on either a gift is fully funded, or a deadline on date certain, notice is sent to the user to take action. There are several contemplated options at this point:

Gift fully funded via Get It Later (708): the FriendGiftr service and/or website notifies the merchant that the gift is fully funded, either electronically or via other means, and we transfer the entire amount to the merchant, minus any transaction fees. The merchant then releases the item and ships the item to the user. The FriendGiftr service and/or website then notifies the user that the item is on its way, and optionally publicize that fact via email, social platforms, etc. that the user has connected to his FG List.

Gift partially funded via Get it Later (707): if a gift is not fully funded and the deadline comes, the user is then presented with two different options. The first option is to "pay off the balance" himself and have the gift shipped to him. In this option, the FriendGiftr service and/or website notifies the merchant to ship similarly to the contemplated option above. The second option is for the user to take all funds collected thus far and we ship him a merchant gift card or similar credit for him to use for future purposes at that merchant. Alternatively, the FriendGiftr service and/or website may offer the option for the user to receive the funds in the form of a universal gift card that can be used at any of the retailer websites or participating merchants, the FriendGiftr service and/or website then publicizes the "purchase" much like in the option above.

Gift funded via Get It Now (709): Once a gift is fully funded, or on a deadline on a date certain, whichever comes first, the FriendGiftr service and/or website refunds the user the funds on the credit card, or whatever form of original payment was used, to purchase the item up front. The FriendGiftr service and/or website then publicizes the "purchase" much like the process described above.

Example 8

Retargeting Options (805)

User Retargeting (806): the FriendGiftr service and/or website can use retargeting if the user abandons the shopping cart without completing his purchase. Retargeting in this case means that the FriendGiftr service and/or website can contact that particular user either via email, if the FriendGiftr service and/or website has that information, or via web banners on other sites that the user visits telling them about FGIT as an option, and the FriendGiftr service and/or website can target that user because the FriendGiftr service and/or website can drop a cookie in their browser when they were at that merchant previously, or a combination of both.

Optionally, the FriendGiftr service and/or website retargeting effort can also include the actual item the user was contemplating buying as long as the FriendGiftr service and/or website or the merchant was able to capture that information before the user abandoned. When the user clicks on the banner, email, etc., he is brought back into the process as described in Example 2.

Gifter Retargeting w/o purchase (807): If the gifter comes to the user's FG list, but fails to fund the gift, the FriendGiftr service and/or website will then retarget that gifter using the retargeting methods similar to the contemplated option outlined above, but instead tailor the message to encourage the gift giver to fund the gift for the user. If the gifter clicks on the banner, email, etc., he is brought back into the process as described in Example 5.

Gifter Retargeting with purchase (808): If the gifter does indeed fund a gift, the FriendGiftr service and/or website will retarget the gifter similarly to the option described above, but instead target the message to encourage the gifter to purchase something for himself at the same merchant that the user shopped at. If he clicks on a banner, email, etc, the gifter is brought back to the merchant site, and the FriendGiftr service and/or website transmits identifiable information to that merchant that the FriendGiftr service and/or website is sending them affiliate traffic.

Thus, specific embodiments, methods and systems for identifying, providing notice of and purchasing a gift in an online environment have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification and claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed:
1. A method for purchasing gifts, comprising:
providing a computing device configured to access one or more retailer websites,
wherein each retailer website lists one or more gifts available for purchase;
selecting, by the computing device, a plurality of gifts available for purchase;
ranking, using the computing device, the selected plurality of gifts to indicate a payment reimbursement order;

purchasing, using the computing device, the ranked, selected plurality of gifts;

receiving one or more monetary contributions;

allocating the one or more monetary contributions according to the rank of the purchased gifts; and deselecting at least one of the purchased gifts.

2. The method of claim 1, further comprising re-allocating the one or more monetary contributions according to the rank of the purchased gifts after the at least one purchased gift is deselected.

3. The method of claim 2, further comprising distributing a partial or full reimbursement for one or more purchased gifts according to the re-allocated one or more monetary contributions.

4. The method of claim 1, further comprising re-ranking the remaining selected plurality of gifts.

5. The method of claim 4, wherein the re-ranking is performed after the at least one of the purchased gifts is deselected.

6. The method of claim 4, further comprising re-allocating the one or more monetary contributions according to the re-ranking of the purchased gifts.

7. The method of claim 6, further comprising distributing a partial or full reimbursement for one or more purchased gifts according to the re-allocated one or more monetary contributions.

8. A system for purchasing gifts, comprising:
a computing device configured to connect to one or more retailer websites over a communication portal, wherein each retailer website lists one or more gifts available for purchase;

an application executable by the computing device or a website server to enable a user to select a plurality of gifts available for purchase, to rank the selected plurality of gifts to indicate a payment reimbursement order, to purchase the ranked gifts, to receive one or more monetary contributions after the purchase of the ranked gifts, and to deselect at least one of the purchased gifts, wherein the application is configured to allocate one or more monetary contributions according to the rank of the purchased gifts.

9. The system of claim 8, wherein the application is configured to re-allocate the one or more monetary contributions according to the rank of the purchased gifts after the at least one purchased gift is deselected.

10. The system of claim 8, wherein the application is configured to re-rank the remaining selected plurality of gifts.

11. The system of claim 10, wherein the application is configured to re-allocate the one or more monetary contributions according to the re-ranking of the purchased gifts.

12. The system of claim 11, wherein the application is configured to distribute a partial or full reimbursement for one or more purchased gifts according to the re-allocated one or more monetary contributions.

13. A method for purchasing gifts, comprising:
providing a computing device configured to access one or more retailer websites,
wherein each retailer website lists one or more gifts available for purchase;

selecting, by the computing device, a plurality of gifts available for purchase;

ranking, using the computing device, the selected plurality of gifts to indicate a funding order;

receiving one or more monetary contributions to fund the purchase of one or more of the selected plurality of gifts;

allocating the one or more monetary contributions according to the rank of the selected plurality of gifts prior to purchase of one or more of the gifts; and deselecting at least one of the selected gifts.

14. The method of claim 13, further comprising not purchasing the at least one deselected gift.

15. The method of claim 14, further comprising receiving the one or more monetary contributions corresponding to the at least one deselected gift.

16. The method of claim 13, further comprising re-allocating the one or more monetary contributions according to the rank of the selected plurality of gifts after the at least one gift is deselected.

17. The method of claim 16, further comprising purchasing each selected gift that is partially or fully funded from the one or more re-allocated monetary contributions.

18. A system for purchasing gifts, comprising:
a computing device configured to connect to one or more retailer websites over a communication portal, wherein each retailer website lists one or more gifts available for purchase;

an application executable by the computing device or a website server to enable a user to select a plurality of gifts available for purchase, to rank the selected plurality of gifts to indicate a funding order, to receive one or more monetary contributions to fund the purchase of one or more of the selected plurality of gifts, and to deselect at least one of the selected gifts, wherein the application is configured to allocate each monetary contribution according to the rank of the selected plurality of gifts before purchase of one or more of the gifts.

19. The system of claim 18, wherein the application is configured to re-allocate the one or more monetary contributions according to the rank of the selected gifts after the at least one gift is deselected.

20. The system of claim 19, wherein the application is configured to purchase each selected gift that is partially or fully funded from the one or more re-allocated monetary contributions.

21. The system of claim 18, wherein the application is configured to re-rank the remaining selected plurality of gifts.

22. The system of claim 21, wherein the application is configured to re-allocate the one or more monetary contributions according to the re-ranking of the selected gifts.

23. The system of claim 22, wherein the application is configured to purchase each selected gift that is partially or fully funded from the one or more re-allocated monetary contributions according to the re-ranking of the selected gifts.

24. The system of claim 18, wherein the application is configured to not purchase the at least one deselected gift.

\* \* \* \* \*